No. 606,664. Patented July 5, 1898.
J. C. HENRY.
ELECTRIC RAILWAY.
(Application filed Apr. 7, 1898.)
(No Model.) 2 Sheets—Sheet 2.
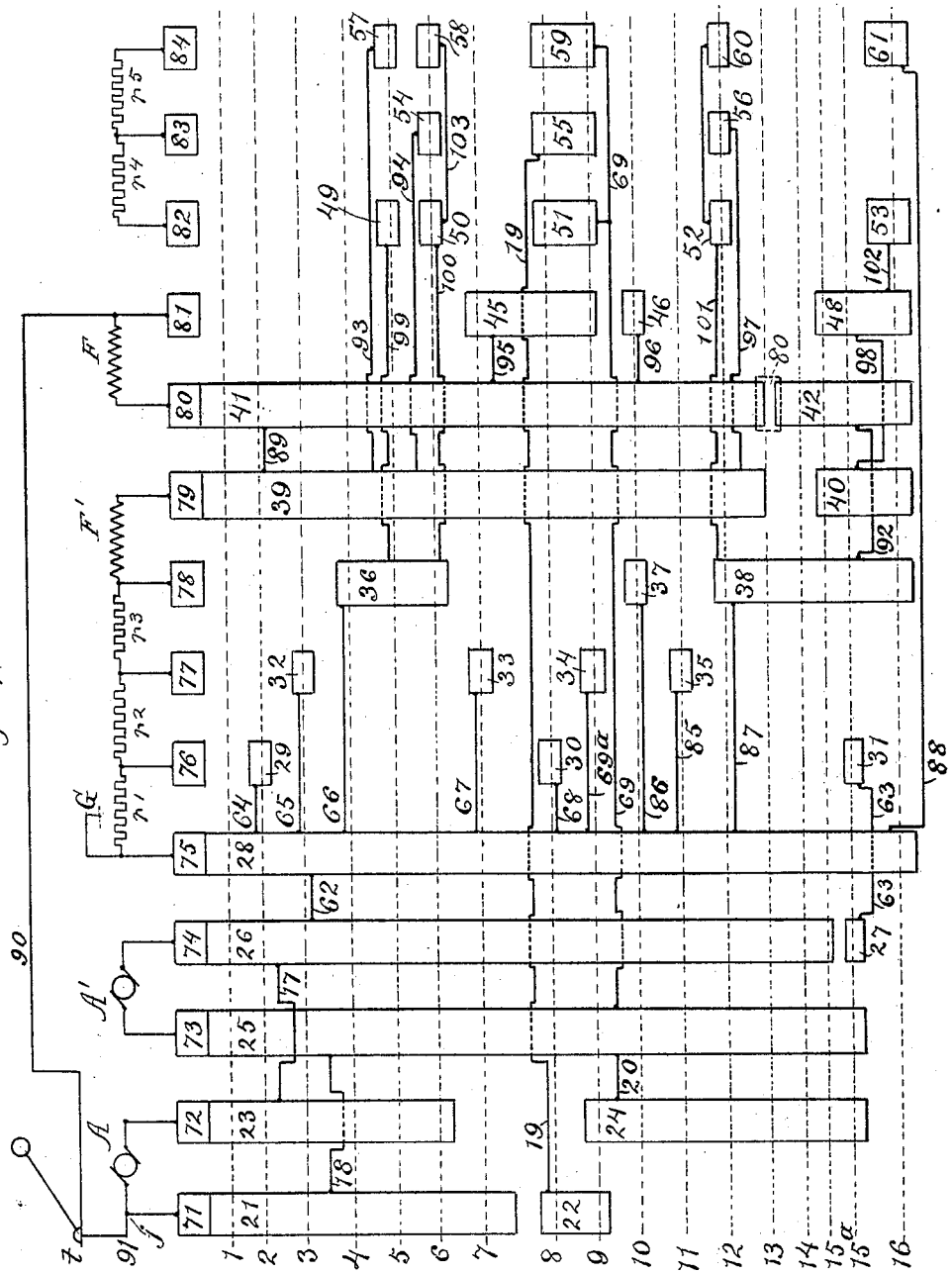
WITNESSES:
M. H. Lloyd.
John S. Gibons.
INVENTOR
John C. Henry

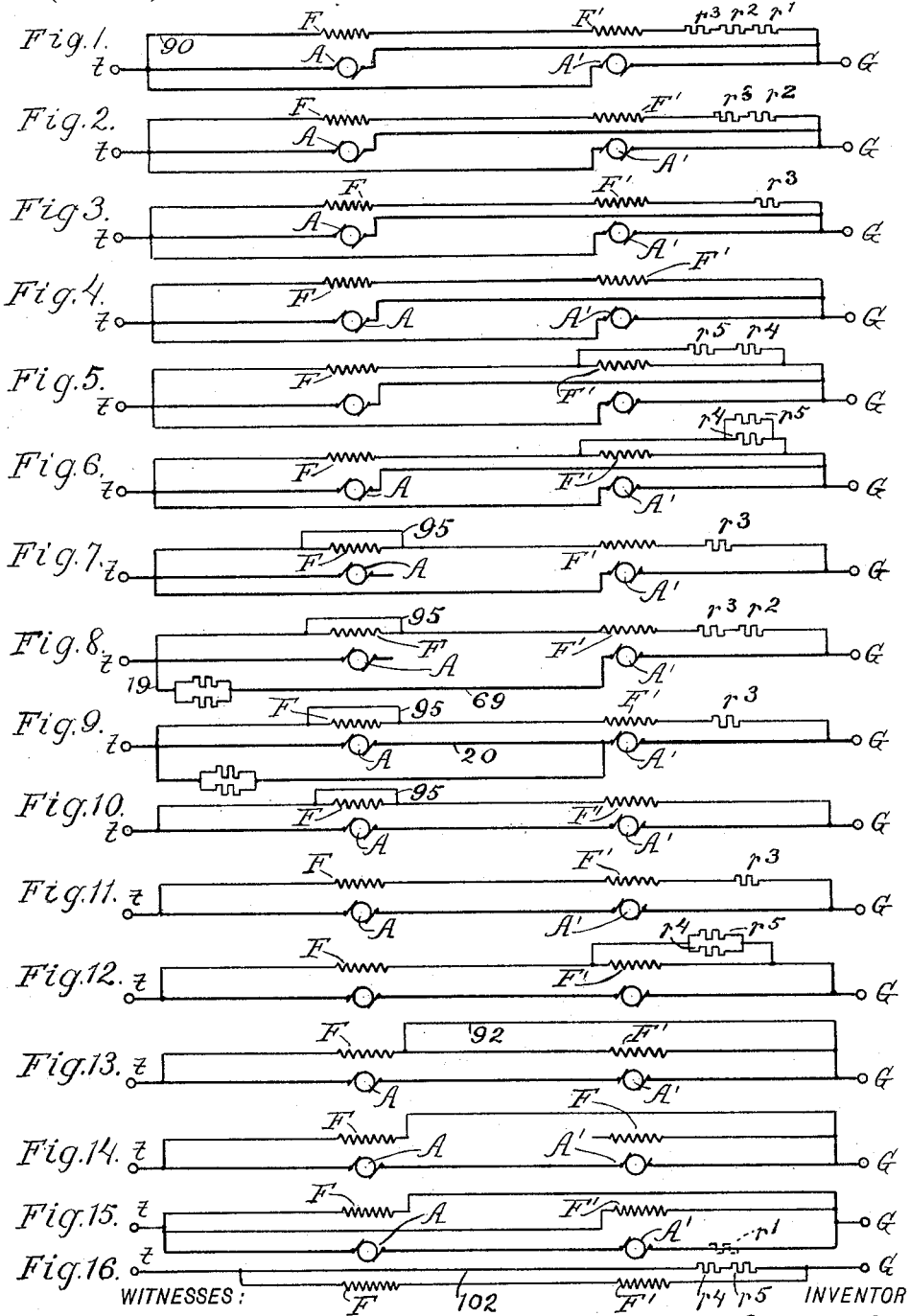

UNITED STATES PATENT OFFICE.

JOHN C. HENRY, OF DENVER, COLORADO.

ELECTRIC RAILWAY.

SPECIFICATION forming part of Letters Patent No. 606,664, dated July 5, 1898.

Application filed April 7, 1898. Serial No. 676,735. (No model.)

*To all whom it may concern:*

Be it known that I, JOHN C. HENRY, a citizen of the United States, residing at Denver, county of Arapahoe, State of Colorado, have invented certain new and useful Improvements in Electric Railways, of which the following is a specification.

This invention relates to improvements in electric railways, and comprises improvements in the connections and controlling devices of two motor-car equipments, whereby the necessary changes in the connections and thus of the speed of the motors may be effected without bringing undue strains on the motor equipment either in the way of excessive mechanical strain or violent and sudden changes of current strength or of high-potential discharges.

Referring to the accompanying drawings, which form a part of this specification, Figures 1 to 16 are diagrams showing successive conditions of the connections of the motor equipment when controlled according to my invention. Fig. 17 is a diagrammatic development of the controller, showing the connections therefrom to the motors, line, ground, and controlling resistances.

I have here indicated only those parts of the car equipment which are essential elements in the carrying out of my invention—namely, the controller, the motors, and resistances. It will, however, be understood that the usual reversing devices and safety appliances may and preferably are used in conjunction with the system herein shown, being applied thereto in the usual manner.

A and A' represent the respective armatures of the two motors of an electrically-propelled vehicle, and F and F' represent the respective field-magnets of such motors.

In Fig. 17, C represents the controller, here shown in development, comprising movable contacts 21 to 61, inclusive, making contact with fixed contacts 71 to 84, inclusive, the movable contacts being preferably mounted on an insulating-cylinder or rotative support in the usual manner and provided with a suitable operating-handle, and the fixed contacts being connected to the armatures A A', field-magnets F F', and regulating resistances $r'$ $r^2$ $r^3 r^4 r^5$, as indicated. The dotted lines marked by the numbers 1 to 16, inclusive, represent successive lines of contact of these movable controller-contacts with the series of fixed contacts and correspond to the successive positions of the circuit connections represented in Figs. 1 to 16, inclusive.

In position 1 (shown in Fig. 1) the armatures are in parallel and the field-magnets are in series, with the maximum resistance included in the field-magnet circuit, so as to give a weak field and maximum acceleration. The field-magnet circuit may be traced from the trolley or line connection $t$ through wire 90 to field-magnet F, thence through controller-contacts 80 41, connection 89 in the controller, controller-contacts 39 79, field-magnet F', and resistances $r^3$ $r^2$ $r'$ to ground connection G. The armature-circuit passes from the line connection $t$ through wire 91 to junction-point $j$, whence it divides, one branch leading through armature A to controller-contacts 72 23, connection 17, controller-contact 26, and connection 62 to controller-contact 28, which engages with ground contact 75, leading to ground connection G. The other branch of the armature-circuit leads from the point $j$ through controller-contacts 71 21, controller connection 18, and controller-contacts 25 73 to one side of armature A', from the other side of which the circuit continues through controller-contacts 74 26 and connection 62 to ground contacts 28 75.

Positions 2 3 4 of the controller are the same as position 1, except that resistances $r'$ $r^2$ $r^3$ are successively short-circuited by the contacts 29 32 36 engaging with fixed contacts 76 77 78, connected to the terminals of these resistances, said contacts 29 32 36 being connected directly to ground contact 28 of the controller by connections 64 65 66. The field-magnets are thus strengthened and the accelerating effect of the motors is correspondingly reduced. To further decrease the acceleration, the armatures are changed from parallel to series relation by means of the successive steps 5 6 7 8 9 10 11.

In the ordinary system of series-multiple control when it is desired to change from parallel to series relation it is usual to first decrease the current in one of the armatures by inserting resistance, usually in several steps, so that, comparatively speaking, but little current is passing through the armature when its circuit is broken in changing over to series connection. In this case I obtain the same or an equivalent effect by adjustment or regulation of the field-magnet circuit, and on account of the comparatively small volume of the field-magnet current such regulation can be more economically and conveniently effected than with the armature-current, which is in the usual series motors the actual electromotive current of the vehicle and is of comparatively large volume.

The first operation in changing from parallel to series (position 5) is therefore to close a shunt around the field-magnet of one of the motors, as F', by means of contacts 36 49 on the controller, connected by connection 99 and engaging, respectively, with one terminal contact 78 of the field-magnet F' and with a terminal contact 82 of resistances $r^4 r^5$, the connection being continued from the other terminal contact 84 of said resistances through controller-contact 57 and connection 93 to controller-contact 39 and thence to the other terminal contact 79 of field-magnet F'. This closure of a shunt around field-magnet F' lowers the resistance of the field-magnet circuit, considered as a whole, and results, therefore, in an increased flow of current in the other field-magnet F and a correspondingly stronger excitation thereof. Under any given conditions of speed of the motors this increased field-magnet excitation of field-magnet F will produce an increase in the counter electromotive force of the corresponding armature and a corresponding decrease of the armature-current. In position 6 this result is carried further by diminishing the resistance of the shunt around the field-magnet F'—as, for example, by putting the resistances $r^4 r^5$ in multiple—this being effected by contacts 50 58, connected by connections 100 103 to contacts 36, and contact 54, connected by connection 94 to contact 39. The overexcitation of field-magnet F will now be so great as to cut down the current in the corresponding armature A to such an extent that its circuit may be broken with but little arcing effect. This breaking of the circuit of armature A is effected in position 7, the circuit of such armature being broken between contacts 23 72. The next operation will be to close the series connection between the two armatures; but in order that this shall not result in short-circuiting armature A A while the latter is in an energized field I prefer to first short-circuit the corresponding field-magnet F, so as to enable it to discharge more or less completely, and then to close the circuit around the armature through a resistance which allows the armature-current to discharge at a safe rate. Thus in position 7 the connection 95 between contacts 41 45, which engage with opposite terminal contacts 80 81 of magnet F, short-circuits said magnet F, and the magnetism thereof is thereby more or less discharged, and then in position 8 the connection 19 69 around armature A and including resistances $r^4 r^5$ in multiple is closed by contact 28 engaging with contact 75 and contacts 51 55 59 engaging with terminal contacts 82 83 84. The series connection 20 between the two armatures may then be safely closed, as in position 9, by contacts 24 and 25 engaging with the armature terminal contacts 72 and 73, thus putting the armature A on a closed circuit, including contacts 71 22, connection 19, contacts 55 83, resistances $r^4 r^5$ in multiple, contacts 82 84 51 59, connection 69, contact 25, connection 20, and contacts 24 and 72. On account of the resistance included in this closed circuit the armature will discharge through same at a safe or moderate rate, even if the field-magnet F has not had time to completely discharge, and thus the closure of the series connection may thus be more quickly effected without danger of excessive current in the shunted armature. Simultaneously with these operations the resistance of the field-magnet circuit may be varied, as by contacts 33 30 34 engaging with resistance-contacts 77 76 and connected to contact 28 by connections 67 68 69. The next step (10) breaks the aforesaid shunt-circuit around armature A by reason of contacts 22 51 55 59 leaving their respective fixed contacts, thus leaving the armatures in direct series connection, but with the field-magnet F of one of them short-circuited. The effect of this is that magnet F being deënergized its armature A develops no counter electromotive force and the line-current passes with substantially full potential to armature A'. At the same time this short-circuiting of field-magnet F will result in such an increased current through field-magnet F' that the electromotive effect of armature A' will be increased, so as to approach but not quite attain that of both armatures A A', acting in multiple in position 4, so that an easy gradation of electromotive effect is obtained.

In my application, Serial No. 675,411, filed March 28, 1898, I have set forth and claimed a system involving, broadly, the application to separately-excited motor equipments of this principle of short-circuiting the field-magnet corresponding to the armature which is about to be short-circuited and transferred to series relation, thereby at the same time deënergizing the field-magnet of one motor and superenergizing the magnet of the other motor, so as to bring all the load on the latter motor. In this case I claim this feature in connection with means for including resistance in the shunt around the armature, which connections are to be changed, as above stated, this resistance serving to render a possible gradual absorption of the armature-current energy. This latter feature is also broadly claimed herein as applied to series-parallel control of any kind whatsoever.

The next step (11) breaks the short circuit around field-magnet F by reason of fixed contact 81 breaking with contact 46, connected by connection 96 to contact 41, thus bringing the armature A into effective operation in series with armature A'. During these steps (10 and 11) the resistance included in the field-magnet circuit may be varied by contacts 35 37, connected to contact 28 by connections 85 86, it being understood that this variation of resistance may extend to the complete cutting out of the resistances from the field-magnet circuit to produce a stronger field excitation. As a further step I then proceed to place the field-magnets in parallel connection, so as to give the maximum field excitation. In order that this may be effected without either breaking the field-magnet circuit or short-circuiting from line to ground, I prefer to first close a shunt, including resistance, around one of the field-magnets, then short-circuit this field-magnet, then break the series connection between the field-magnets, and finally close a parallel connection to the line. Thus in position 12 a shunt-circuit 97 101 is established around field-magnet F by controller-contacts 38 39 52 56 60 engaging with fixed contacts 78 79 82 83 84, the resistances $r^4$ $r^5$ being included in parallel in this shunt-circuit. The effect of this is to diminish the strength of magnet F' and correspondingly increase the strength of magnet F, so that the latter will be stronger than in position 11. The motor A F will now take most of the load. The next step (position 13) closes a direct shunt-circuit around field-magnet F' by reason of the fixed contact 80, whose position is indicated in dotted lines, bridging the break between movable contacts 41 and 42, the short circuit thus leading from contact field-magnet terminal 79 to contact 39, connection 89, contacts 41, 80, and 42, connection 92 to contact 38, and thence to the other terminal 78 of field-magnet F'. Field-magnet F' will thus be discharged, and its circuit may then be safely broken, this being effected in position 14 by contact 39 leaving fixed contact 79. The next step (15) closes a connection from magnet F' to line by contact 40 engaging with field-magnet terminal 79, said contact 40 being connected by connection 98 to contact 48, which engages in this position with line-contact 81. The field-magnets having now their maximum energization, the acceleration effect will be comparatively small, and it may be further decreased by the insertion of resistance into the armature-circuit, as indicated in position 15$^a$, contacts 27 31, connected by connection 63, coming into operation in this position to include resistance $r'$ in the armature-circuit. This resistance is indicated in dotted lines in Fig. 15. Finally, the armature-circuit is broken in position 16, and at the same time a closed circuit is formed, including the field-magnet circuit and resistances $r^4$ $r^5$, which are preferably non-inductive, so as to readily absorb or allow the passage of the instantaneous induced high-potential currents from the field-magnets when line connection is broken for any reason—as, for example, by the trolley leaving the line. This closed circuit is formed by the contacts 78 38, connection 87, contact 28, connection 88, contacts 61 84, non-inductive resistances $r^5$ $r^4$, contacts 82 53, connection 102, contact 48, and thence through the field-magnets in parallel, as above described.

It will be seen from the above description that the purpose and effect of this invention is to enable the gradual decrease of the counter electromotive force of the motors when the cars are to be speeded up and the gradual increase of such counter electromotive force when the car is to be retarded. The feature shown in position 15 in the development, whereby the same resistance is used for the armature and field circuits, will be claimed in a subsequent copending application.

Having thus described my invention, the following is what I claim as new therein and desire to secure by Letters Patent:

1. The method of controlling the two motors of a car equipment, wherein the field-magnets are connected in series in a circuit independent of the armature-circuit, which consists in closing a shunt around one of the field-magnets, said shunt including a resistance, then decreasing said resistance, so as to increase the current in and energization of, the field-magnet of the other motor and thus correspondingly decreasing the current in the armature of such other motor, and then breaking the circuit of such other armature.

2. The method of controlling electric motors whose field-magnets are in a circuit independent of their armatures which consists of decreasing the resistance of the field-magnet circuit of one motor so as to increase the energization of the field-magnet of the other motor and correspondingly decrease the armature-current of said other motor.

3. The method of changing from parallel to series relation the armatures of the two motor-armatures of a car equipment whose field-magnets are connected in an independent circuit, which consists in closing a shunt-circuit, including a resistance, around the field-magnet of one of the motors decreasing the resistance of the shunt-circuit so as to increase the field magnetization of the other motor and to correspondingly decrease the armature-current of such other motor, then opening the circuit of the armature of such other motor and closing a series connection between the armatures.

4. In a controlling system for a two-motor equipment the combination with the armatures and field-magnets of the two motors, of controlling devices and connections adapted to place the armatures of such motors in parallel relation, and to place the field-magnets of such motors in series relation, said controlling device comprising means for closing a shunt-circuit including a resistance around the field-magnet of one of the motors, and for decreasing the amount of such resistance, and means for opening or breaking the circuit of the armature of the other motor and connecting the motors in series.

5. In a controlling system for a two-motor equipment the combination with the armatures and field-magnets of the two motors, of controlling devices and connections adapted to place the armatures of such motors in parallel relation, and to place the field-magnets of such motors in series relation, said controlling device comprising means for closing a shunt-circuit including a resistance around the field-magnet of one of the motors and means for opening or breaking the circuit of the armature of the other motor and connecting the motors, in series.

6. The method of controlling an electric motor whose armature and field-magnets are in independent circuits, which consists in short-circuiting the field-magnet of such motor then breaking the armature-circuit and simultaneously closing a circuit including the armature and a resistance.

7. The combination with the armatures and field-magnets of two electric motors, of controlling devices and connections for placing the said armatures in parallel relation, and placing the said field-magnets in series relation in an independent circuit, said controller comprising also means for short-circuiting the field-magnet of one of the motors, a resistance and means comprised in the controller for opening the circuit of the armature which is under the short-circuited field-magnet, for closing a circuit including said armature and said resistance, and for closing a series connection between the armatures.

8. The combination with two electric motors having their field-magnets connected in series in a circuit independent of their armatures, of controlling devices and connections for connecting the armatures in either parallel or series relation, a resistance and means comprised in said controlling devices for removing one of the armatures from its parallel connection, connecting it in a closed circuit with said resistance, connecting it in series with the other armature, and then breaking the said circuit through the resistance.

9. The combination with two electric motors having their field-magnets connected in a circuit independent of their armatures, of a resistance and means for closing a circuit, including said resistance around one of said field-magnets.

10. The combination with two electric motors having their field-magnets connected in circuit by connections independent of their armatures, of controlling devices for changing the said field-magnets from series to parallel relation.

11. The combination with two electric motors having their field-magnets connected in circuit by connections independent of their armatures, of controlling devices for changing said field-magnets from series to parallel relation, said controlling devices comprising means for closing a shunt-circuit around one of said field-magnets, and then breaking the circuit of said field-magnet and then connecting such magnet in parallel relation with the other field-magnet.

12. The combination with two electric motors, having their field-magnets connected in circuit by connections independent of their armatures, means for connecting said magnets in series relation, a resistance and controlling devices for closing a shunt-circuit, including said resistance around one of said magnets, then short-circuiting such magnet, open-circuiting it and connecting it in parallel with the other magnet.

13. The combination with the armatures and field-magnets of two electric motors, independent circuits comprising said armatures and field-magnets respectively, means for breaking said armature-circuit, and a shunt-circuit including a non-inductive resistance and means for closing a circuit including said resistance and said field-magnets when the armature-circuit is broken.

JOHN C. HENRY.

Witnesses:
M. H. LLOYD,
JOHN S. GIBONS.